P. M. EARLE.
Tile-Gate.

No. 222,389. Patented Dec. 9, 1879.

Witnesses:
Sam R. Turner
Edwin Battzley

Inventor:
Philip M. Earle
By R. S. & A. P. Lacey Att'ys

UNITED STATES PATENT OFFICE.

PHILIP M. EARLE, OF CLINTON, ILLINOIS.

IMPROVEMENT IN TILE-GATES.

Specification forming part of Letters Patent No. 222,389, dated December 9, 1879; application filed October 23, 1879.

*To all whom it may concern:*

Be it known that I, PHILIP M. EARLE, of Clinton, in the county of De Witt and State of Illinois, have invented certain new and useful Improvements in Tile-Gates; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to traps for tiles employed in the drainage of land.

It consists in a perforated head-piece, to which is swung the gate, all of which will be hereinafter fully explained.

Figure 1:
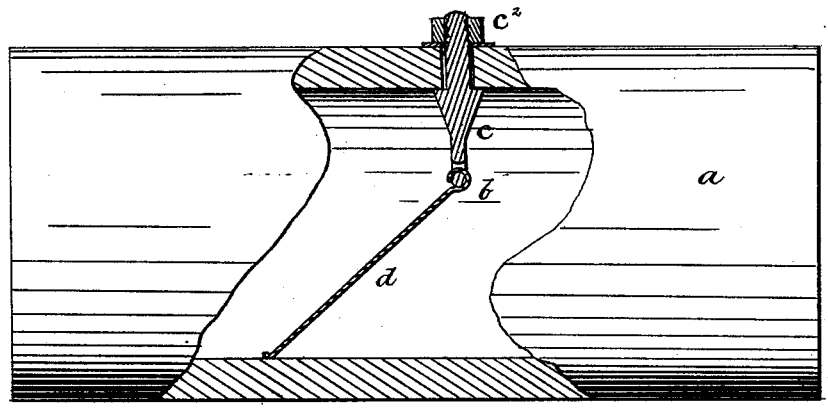
Figure 2:
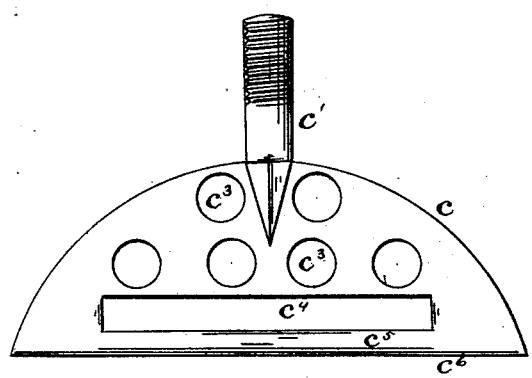
Figure 3:
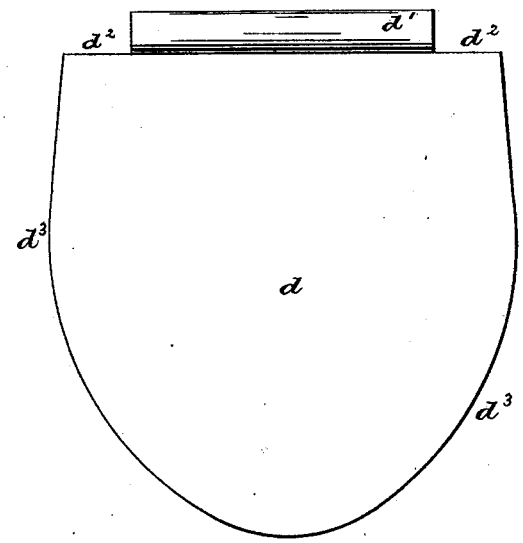

In the drawings, Figure 1 is a side view of a section of tile, partially in section, showing my invention applied therein. Fig. 2 shows the head-piece, and Fig. 3 is the gate.

$a$ is a tile of ordinary form. $b$ is the trap, which is secured within the tile, as shown in Fig. 1.

The trap is composed of two parts—namely, the semicircular head $c$ and the gate $d$. The head $c$ is made semicircular on its upper side, so that it will fit snugly the contour of the inner side of the tile. It is provided with a threaded stem, $c'$, which projects upward through the tile $a$, and it is held firmly in place by the nut $c^2$. It has made through it the series of air-passages $c^3$ and the horizontal slot $c^4$, forming a bar, $c^5$, which serves as a pintle, on which the gate $d$ is hung.

The gate $d$ is provided with a loop, $d'$, on its upper edge, $d^2$, which edge is made straight and joins snugly against the under straight edge, $c^6$, of the head $c$ when the two parts $c$ and $d$ are fastened together by the loop $d'$ hooked over the bar $c^5$, and its outer edge or contour, $d^3$, is made so that it will fit snugly against the sides of the tile when it is down, as shown in Fig. 1.

In tiles employed in the drainage of land, it is desired that a free circulation of air shall be maintained through them. The ordinary trap has prevented this circulation. If the end of the tile-drain be left open, rats and vermin can enter.

With my device I have a protection against the entrance of animals into, and at the same time permit a free flow of the water out of and circulation of air through, the tiles.

Having described my invention, what I claim, and desire to secure by Letters Patent, is—

The trap for drain-tiles composed of the gate $d$ and the perforated head $c$, provided with the stem $c'$ and bar or pintle $c^5$, as and for the purposes set forth.

In testimony that I claim the foregoing as my own I affix my signature in presence of two witnesses.

PHILIP M. EARLE.

Witnesses:
 WM. H. HARRISON,
 HOMER B. TAYLOR.